No. 699,226. Patented May 6, 1902.
E. NYSWONGER.
FRUIT CORER AND SEEDER.
(Application filed Jan. 18, 1901.)
(No Model.) 2 Sheets—Sheet 1.

Witnesses: Inventor:
Elijah Nyswonger.
by
Attorneys.

THE NORRIS PETERS CO., PHOTO-LITHO., WASHINGTON, D. C.

No. 699,226. Patented May 6, 1902.
E. NYSWONGER.
FRUIT CORER AND SEEDER.
(Application filed Jan. 18, 1901.)
(No Model.) 2 Sheets—Sheet 2.
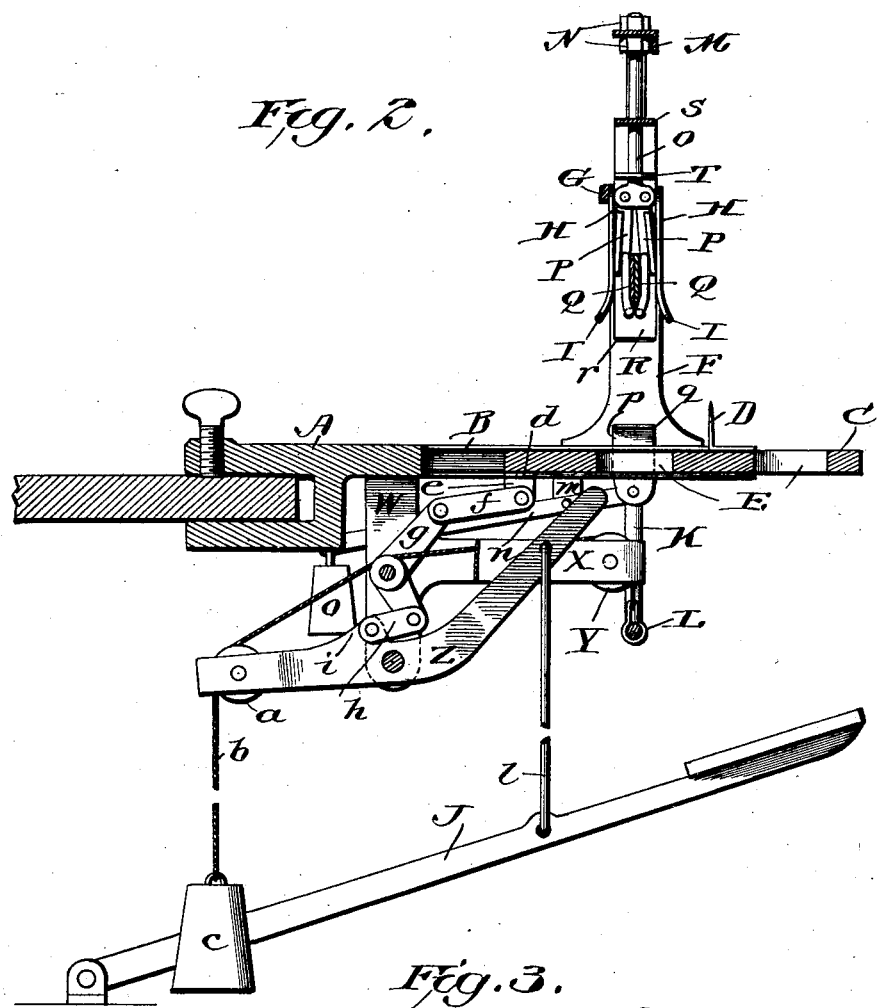
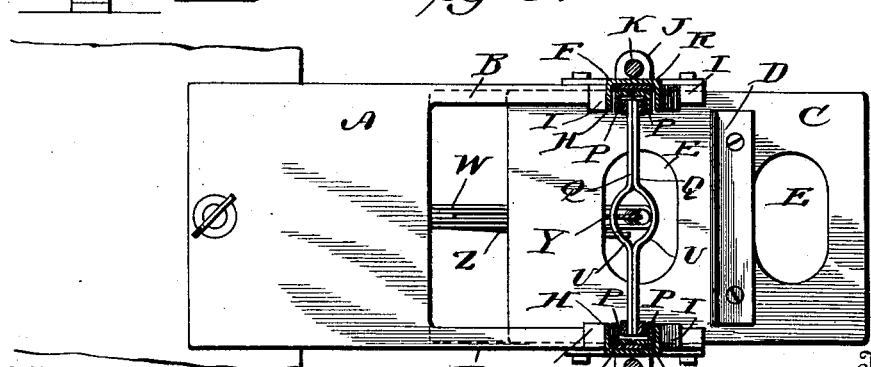
Witnesses: Inventor:
Elijah Nyswonger,
Attorneys

UNITED STATES PATENT OFFICE.

ELIJAH NYSWONGER, OF HANFORD, CALIFORNIA.

FRUIT CORER AND SEEDER.

SPECIFICATION forming part of Letters Patent No. 699,226, dated May 6, 1902.

Application filed January 18, 1901. Serial No. 43,741. (No model.)

*To all whom it may concern:*

Be it known that I, ELIJAH NYSWONGER, a citizen of the United States, residing at Hanford, in the county of Kings and State of California, have invented a new and useful Fruit Corer and Seeder, of which the following is a specification.

This invention relates to improvements in fruit-pitting machines; and the object is to provide a simple and effective machine which may be conveniently operated for removing the pits from peaches and other fruit and the cores from apples and similar fruit and at the same time halving said fruit.

With the above object in view the invention consists in the novel features of construction hereinafter fully described, particularly pointed out in the claims, and clearly illustrated by the accompanying drawings, in which—

Figure 1:
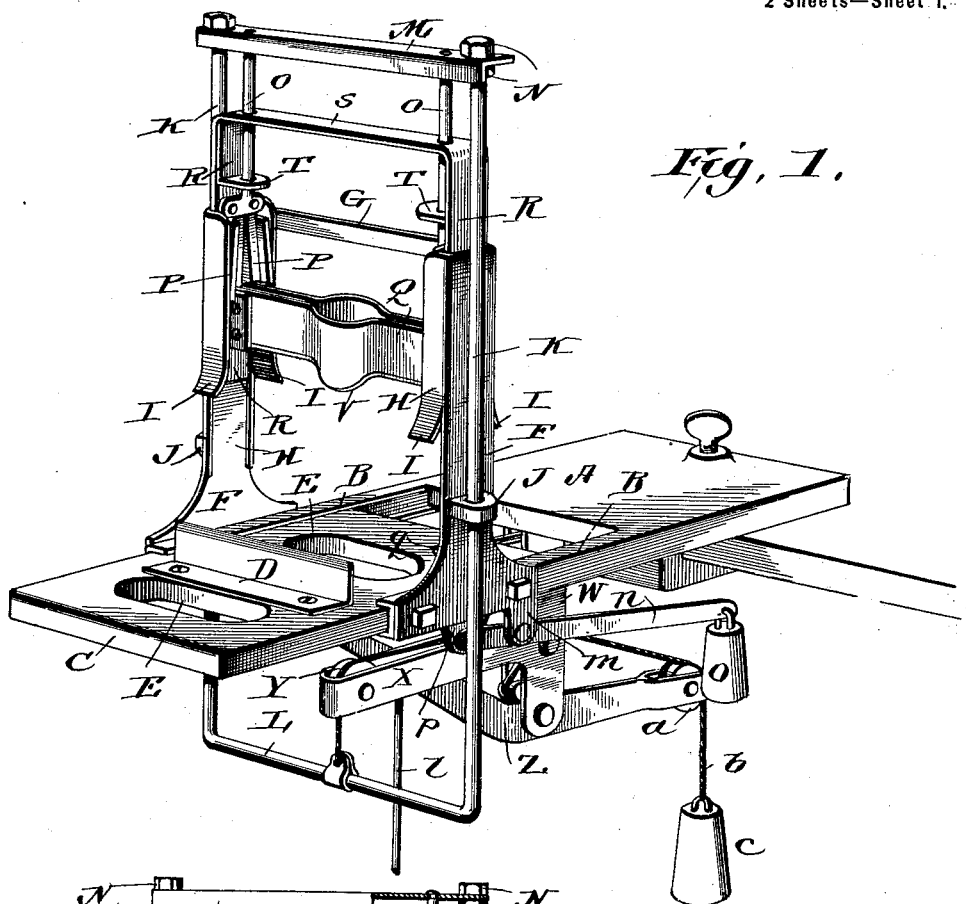
Figures 4, 5:
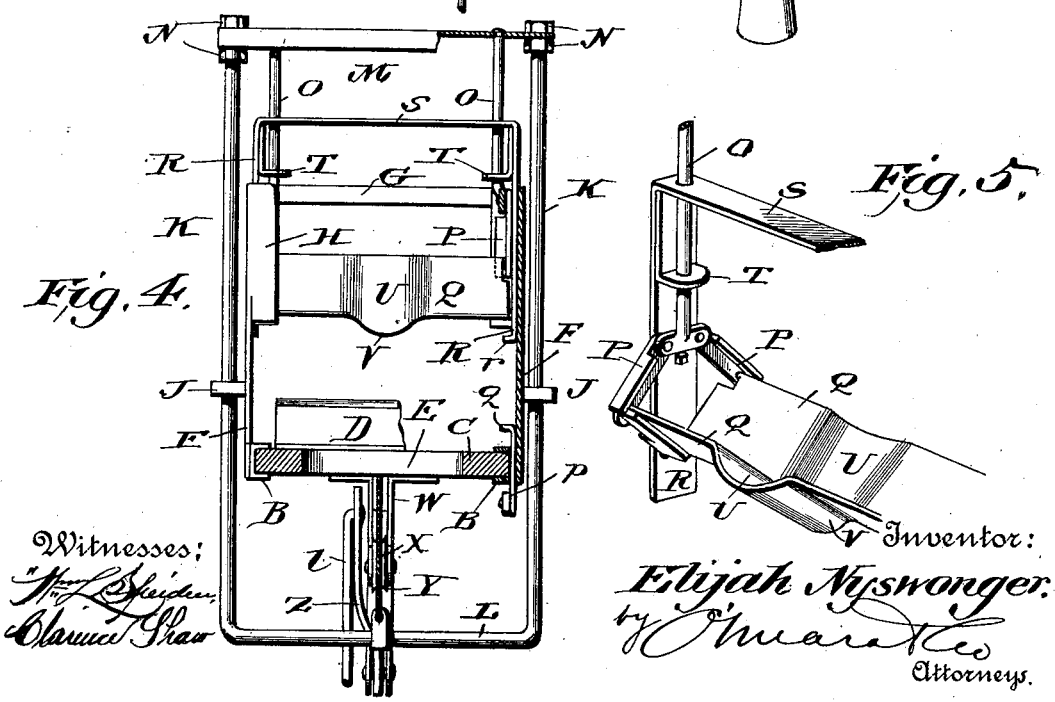

Figure 1 is a perspective view of a machine embodying my invention; Fig. 2, a vertical longitudinal sectional view with the cutters open; Fig. 3, a top plan view, partly in section; Fig. 4, a vertical transverse sectional view, and Fig. 5 is a detail view.

Referring now more particularly to the accompanying drawings, A designates a base which is secured to any suitable support and which carries at its edges and projecting beyond one end thereof the longitudinally-extending slideways B. Sliding in these ways B is a board C, which constitutes the movable section of the base, said movable section having secured thereto intermediately of its ends a transversely-extending vertically-arranged cutter D and formed on each side of said cutter with the openings E, through which the halves of the fruit fall.

Raised from the slideways B at their outer ends are standards F, connected at their upper ends by a cross-bar G and formed at said upper ends with slideways H, the side walls of which diverge at the lower ends thereof, as indicated by the reference-letter I.

On the outer sides of standards F and intermediately thereof are the vertically-arranged guides J, in which the legs K of a substantially U-shaped frame L slide. The legs K of said sliding frame are connected at their upper ends by a cross-bar M, which is removably secured thereon by nuts N, fitting upon the screw-threaded upper ends of said legs K. Rigidly secured to said cross-bar M and depending therefrom adjacent to its respective ends are arms O, to the lower ends of which flanged links P are pivoted, said links at their opposite ends being pivoted to the ends of sections Q of a sliding cutter. These sections Q at their lower edges and at their respective ends are pivoted to the legs R of a second substantially U-shaped frame, which slides in the ways H. Said frame has its cross-bar S perforated to receive the arms O and also carries inwardly-extending guides T, which are perforated for the reception of said arms, upon which the frame is movable. Each of the sections of the movable cutter comprises a central outwardly-bulged semicircular portion U and laterally-extending arms disposed on opposite sides thereof and having their lower edges sharpened to form cutting edges. Said sections Q are formed at the lower edges of the semicircular portions with downwardly-extending convex cutting edges V.

Secured to the under side of section A of the base and depending therefrom is a bracket W, having a forwardly-extending portion X, in which a pulley Y is mounted. Intermediately pivoted in said bracket is a lever Z, having its forward end bearing against the lower cross-bar of sliding frame L and its opposite end provided with a pulley *a*. A rope or cable *b* is secured at one end to said lower cross-bar of the sliding frame L and passes upwardly over pulley Y of the bracket and downwardly over pulley *a* of lever Z, a weight *c* being attached to the end thereof.

Secured to the under side of sliding section C of the base is a plate *d*, having a depending attaching portion *e*, to which one end of a link *f* is pivoted, the opposite end of said link being pivoted to the upper end of a bell-crank lever *g*, which is pivotally mounted in the bracket W. The opposite end of said bell-crank lever is pivotally connected by a link *h* with an arm *i*, projecting from the upper edge of lever Z, near its pivotal point. Pivoted at one end beneath the machine is a treadle *j*, which is connected with lever Z by a rod *l*.

Pivoted near one end of a plate *m*, depending from one of the slideways B, is an arm *n*, carrying at its outer end a weight o and at its inner end having pivotally connected thereto a vertically-movable stop-plate p, normally held by said weight above the upper surface of sliding section C of the base and having its upper end turned inwardly, as indicated by the letter q, and disposed in the path of the sliding frame carrying the cutter-sections Q, the lower end of one of the legs R of said frame being bent inwardly slightly, as indicated by the letter r, to form an engaging portion for contacting with said stop-plate p when frame L has been moved downwardly far enough.

The operation of my invention is as follows: The sliding frame L being in its raised position, weight c holding it in such position, with the sliding section C of the base in its outward position, the fruit is placed upon cutter D in an upright position and the treadle depressed. Upon the depression of said treadle levers Z and g and links f and h will first effect the inward movement of said sliding section C of the base until the cutter D, with the fruit thereon, is brought directly beneath the cutter-sections Q. The sliding frame is moved downwardly by the engagement of the forward end of lever Z therewith, the frame carrying the cutter-sections moving with frame L and having no relative movement thereon until the stop-plate p is engaged by the inturned end r of leg R. A resistance then being offered to the downward movement of the cutter-carrying frame and the downward movement of the frame L being continued, said cutter-sections Q swing on their pivots and separate at their upper edges, permitting the cutting edges V to follow the contour of the pit and pass around the same and at the same time cause the separated sections of the fruit to pass downwardly through the two openings E of the movable base-section C, the fruit having been cut in two portions by the straight cutting edges of cutter-sections Q and the cutting edge of cutter D. As soon as the treadle is released weight c moves frame L to its raised position and sliding section C to its outward position. As frame L moves upwardly, carrying with it the cutter-carrying frame, the cutter-sections are returned to their normal positions by the engagement of links P with the diverging lower ends I of slideways H. The stop-plate p is also returned to its normal position by weight a. This plate not only serves as a stop to offer resistance to the downward movement of the cutter-sections, but also acts as a yielding member to remove the shock and jar incident to the contact of the cutter-carrying frame therewith.

Having thus fully described my invention, what I claim as new, and desire to secure by Letters Patent of the United States, is—

1. In a fruit-pitting machine, the combination of a sliding frame, links pivotally connected at one end therewith, cutters pivoted at one of their edges to the opposite ends of said links, a yielding frame carried by said sliding frame and pivotally supporting the opposite edges of the cutters, means for reciprocating said sliding frame, means for supporting the fruit during the operation of the cutters, and means interposed in the path of said yielding frame for offering a resistance to its movement, substantially as described.

2. In a fruit-pitting machine, the combination of a sliding frame, arms carried thereby, links pivoted at one end to said arms, a yielding frame supported by said arms, cutters pivoted at their cutting edges to said frame with said cutting edges arranged in close proximity to each other, said cutters at their opposite edges being pivoted to the opposite ends of the links, means for reciprocating said sliding frame, means for supporting the fruit during the operation of the cutters, and a stop interposed in the path of said yielding frame, substantially as described.

3. In a fruit-pitting machine, the combination of a support, standards raised therefrom and carrying guides, a frame sliding in said guides, a slideway formed on the inner sides of said standards with the lower ends of the walls of the slideways formed diverging, arms carried by said sliding frame, a yielding frame movable upon said arms and moving in said slideways, a sectional cutter carried by said yielding frame, the sections of the cutter being pivoted to said frame at their cutting edges, links pivoted to the cutter-sections at their opposite edges and to the arms carried by the sliding frame, means for reciprocating said sliding frame, and a stop interposed in the path of said yielding frame, substantially as described.

4. In a fruit-pitting machine, the combination of a table formed with openings, an impaling-blade carried by said table and disposed between said openings, a reciprocable sectional cutter having the sections thereof arranged parallel with each other and separable at their upper edges so as to deflect the halves of the fruit into said openings, means for reciprocating said cutters and means for effecting the separation of said cutter-sections, substantially as described.

5. In a fruit-pitting machine, the combination of a table, a vertically-movable substantially rectangular frame slidable on said table, a cutter carried by said frame, an intermediately-pivoted lever supported by said table and engaging said frame, a pulley mounted in said lever, a rope attached to the frame and passing over said pulley, a weight carried by said rope, a treadle, and an operative connection between said treadle and said lever, substantially as described.

ELIJAH NYSWONGER.

Witnesses:
Z. D. JOHNS,
FRANCIS CUNNINGHAM.